(12) United States Patent
Yamane

(10) Patent No.: US 7,373,242 B2
(45) Date of Patent: May 13, 2008

(54) NAVIGATION APPARATUS AND NAVIGATION METHOD WITH IMAGE RECOGNITION

(75) Inventor: Akihiro Yamane, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 566 days.

(21) Appl. No.: 10/957,622

(22) Filed: Oct. 5, 2004

(65) Prior Publication Data

US 2005/0125142 A1   Jun. 9, 2005

(30) Foreign Application Priority Data

Oct. 7, 2003   (JP)   ............... 2003-348452

(51) Int. Cl.
*G01C 21/00* (2006.01)
*B64D 45/04* (2006.01)

(52) U.S. Cl. ................... 701/200; 701/220; 701/4; 340/947; 340/953; 348/117; 348/144

(58) Field of Classification Search ............... 701/200, 701/220, 221, 210, 3, 4; 340/937, 947, 951, 340/953; 348/113, 117, 139, 140, 142, 144; 342/32–35, 66, 357.08
See application file for complete search history.

(56) References Cited

U.S. PATENT DOCUMENTS

| | | | | |
|---|---|---|---|---|
| 4,866,626 A | * | 9/1989 | Egli | ............... 701/207 |
| 5,072,396 A | * | 12/1991 | Fitzpatrick et al. | ......... 701/217 |
| 5,235,513 A | * | 8/1993 | Velger et al. | ............... 701/16 |
| 5,716,032 A | * | 2/1998 | McIngvale | ............... 244/185 |
| 5,894,323 A | * | 4/1999 | Kain et al. | ............... 348/116 |
| 6,157,876 A | * | 12/2000 | Tarleton et al. | ............... 701/16 |
| 6,181,271 B1 | * | 1/2001 | Hosaka et al. | ............... 342/33 |
| 6,952,632 B2 | * | 10/2005 | Robert et al. | ............... 701/16 |
| 2004/0075018 A1 | | 4/2004 | Yamane | |

FOREIGN PATENT DOCUMENTS

| | | |
|---|---|---|
| JP | 8-7199 | 1/1996 |
| JP | 11-72558 | 3/1999 |
| JP | 2004-130852 | 4/2004 |

* cited by examiner

*Primary Examiner*—Tan Q Nguyen
(74) *Attorney, Agent, or Firm*—Smith, Gambrell & Russell, LLP

(57) ABSTRACT

A navigation apparatus with image recognition, includes: an imaging section for obtaining a stereo image of a target spot; an inertial information detecting section for measuring an attitude angle of a body and an acceleration of the body; an image process calculating section for calculating a relative position of the body with respect to the target spot based on the stereo image and the attitude angle; and a navigation calculating section for calculating navigation information based on the attitude angle, the acceleration and the relative position.

14 Claims, 3 Drawing Sheets

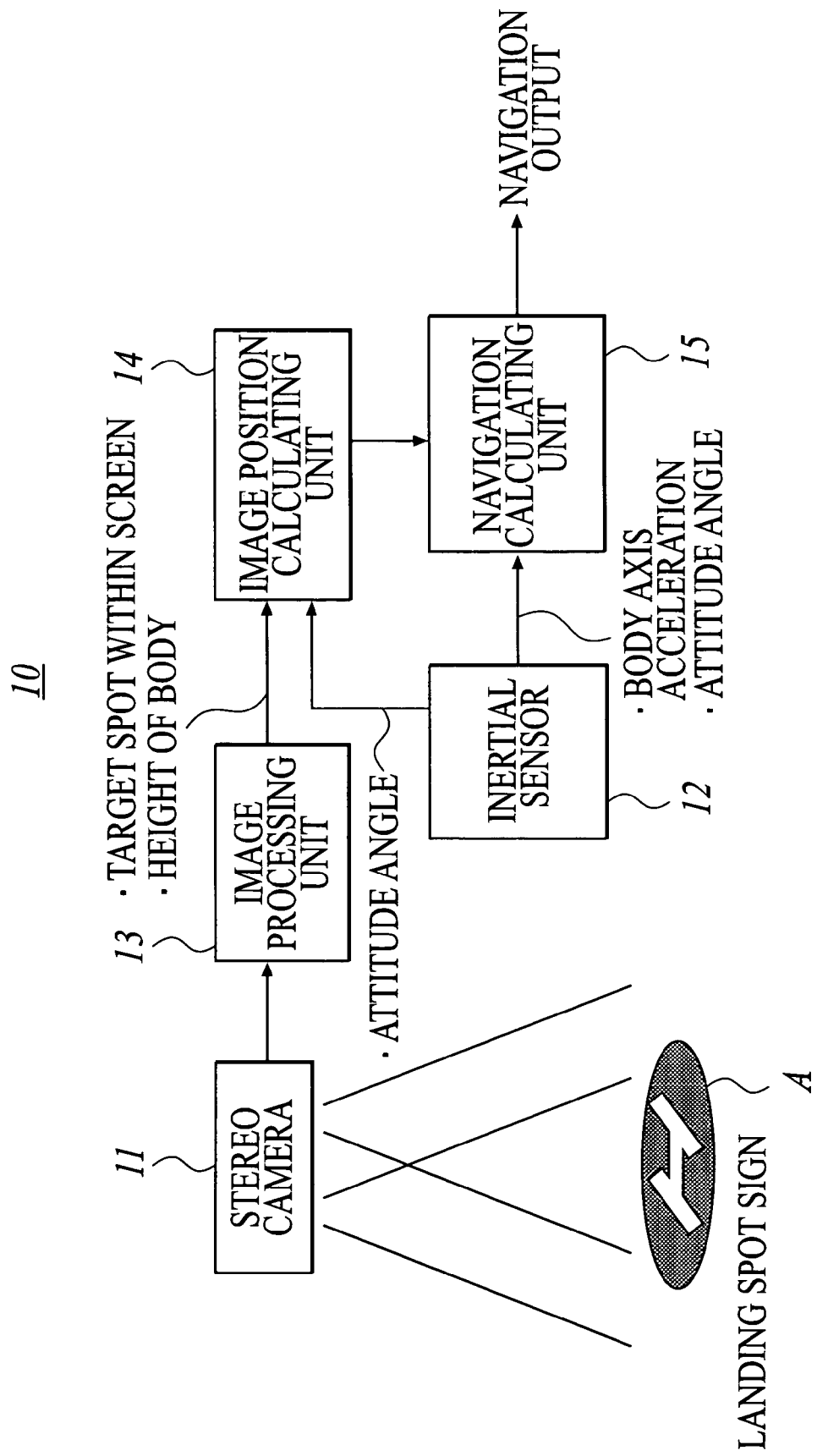

NAVIGATION APPARATUS AND NAVIGATION METHOD WITH IMAGE RECOGNITION

BACKGROUND OF THE INVENTION

1. Field of the Invention

The present invention relates to a navigation apparatus and a navigation method with image recognition.

2. Description of Related Art

So far, various technologies for navigating a vertical-takeoff aircraft such as a helicopter and the like to land on the ground (a ship) have been proposed.

One proposed example of them is a technology for navigating a helicopter to a predetermined target spot by detecting sound wave generated from the helicopter with a microphone, by calculating a position of the helicopter based on an electric signal regarding the sound wave, and by transmitting the calculation result to the helicopter (see JP-Tokukaihei-8-7199A, Page 1, FIG. 1). Further, another proposed example of them is a technology for navigating a flying object to a predetermined target spot based on positional information of the flying object obtained by using a millimeter-wave radar apparatus or a stereo camera apparatus located on the ground (see JP-Tokukaihei-11-72558A, Page 1, FIG. 1).

Further, these days, what is developed is "DGPS/INS hybrid navigation apparatus" which accurately measures relative positional information of an aircraft body with respect to a predetermined target spot by using DGPS such as RTK-GPS or the like, and corrects positional information obtained by an inertial sensor based on accurate positional information obtained by DGPS. By using such hybrid navigation apparatus, it is possible to navigate an aircraft body to a predetermined target spot.

However, when the technology of JP-Tokukaihei-8-7199A or the technology of JP-Tokukaihei-11-72558A is adopted, it is necessary to set ground facilities for the navigation control, such as a microphone, a millimeter-wave radar apparatus, a stereo camera apparatus and the like near the predetermined target spot in advance. Therefore, it is not possible to navigate an aircraft body to a spot near which these ground facilities for the navigation control are not set.

Further, in the navigation technology with the above-mentioned DGPS/INS hybrid navigation apparatus, since the differential between positional information of a target spot and positional information of an aircraft body is used as relative positional information for navigating the aircraft body, it is necessary to measure an absolute coordinate of the target spot in advance. Therefore, it is necessary to spend a certain amount of time and labor for the measurement of the absolute coordinate. Further, since it is necessary to set a GPS base station for transmitting correction information for DGPS to the aircraft on the ground, a system structure thereof becomes complicated. Further, in order to wait for the convergence of DGPS solutions, it is necessary to make an aircraft do the hovering or the slow flight up in midair near the target spot before the landing. Therefore, flying time becomes longer and extra fuel is wasted unnecessarily.

SUMMARY OF THE INVENTION

An object of the present invention is to provide a navigation apparatus which is capable of obtaining positional information of an aircraft with respect to a predetermined target spot accurately and immediately, without using ground facilities or DGPS for navigation control.

In order to solve the aforementioned problem, in accordance with a first aspect of the present invention, a navigation apparatus with image recognition, comprises: an imaging section for obtaining a stereo image of a target spot; an inertial information detecting section for measuring an attitude angle of a body and an acceleration of the body; an image process calculating section for calculating a relative position of the body with respect to the target spot based on the stereo image and the attitude angle; and a navigation calculating section for calculating navigation information based on the attitude angle, the acceleration and the relative position.

In accordance with a second aspect of the present invention, a navigation method with image recognition comprises: obtaining a stereo image of a target spot; measuring an attitude angle of a body and an acceleration of the body; calculating a relative position of the body with respect to the target spot based on the stereo image and the attitude angle; and calculating navigation information based on the attitude angle, the acceleration and the relative position.

According to the apparatus of the first aspect and the method of the second aspect, the image process calculating section calculates a relative position of the body with respect to a predetermined target spot by processing image information of the target spot obtained by the imaging section. Further, the navigation calculating section generates and outputs navigation information (positional information of the body and the like) based on an attitude angle and an acceleration of the body calculated by the inertial information detecting section and a relative position of the body calculated by the image process calculating section. In other words, by correcting information calculated by integrating the acceleration of the body measured by the inertial information detecting section, the information having a bias error, with the use of information regarding a comparatively accurate relative position of the body calculated with the image recognition process, it is possible to calculate more valid navigation information.

Therefore, without ground facilities for navigation control such as a microphone, a millimeter-wave radar apparatus and the like provided in the vicinity of the predetermined target spot, it is possible to accurately obtain navigation information from the body itself. As a result, even to a spot where ground facilities for navigation control are not provided, it is possible to navigate the body accurately. Further, since it is possible to accurately obtain the navigation information from the body itself without using DGPS, it is not necessary to measure an absolute coordinate of the target spot. Therefore it is possible to reduce labor and time for measuring the absolute coordinate. Further, since it is not necessary to provide a GPS receiver, it is possible to simplify the system structure. Furthermore, since it is not necessary to wait for the convergence of the DGPS solution, it is possible to obtain the navigation information immediately, and therefore it is possible to reduce flying hours and save the fuel.

Preferably, in the apparatus of the first aspect, the navigation calculating section comprises: a velocity calculating unit for calculating velocity by integrating the acceleration; and a position calculating unit for calculating a body position by integrating the velocity, and the apparatus corrects the acceleration, the velocity and the body position based on a position error calculated by comparing between the relative position and the body position, and outputs the corrected velocity and the corrected body position as the navigation information.

Preferably, in the method of the second aspect, the calculating the navigation information comprises: calculating a velocity by integrating the acceleration; calculating a body position by integrating the velocity; correcting the acceleration, the velocity and the body position based on a position error calculated by comparing the relative position to the body position; and outputting the corrected velocity and the corrected body position as the navigation information.

According to the above-mentioned apparatus and method, information calculated by integrating the acceleration of the body measured by the inertial information detecting section, the information having a bias error, is corrected with the use of a comparatively accurate relative position of the body calculated by the image process calculating section, for calculating more valid navigation information (positional information of the body, and the like). Therefore, without using ground facilities for navigation control or DGPS, it is possible to obtain navigation information with respect to the target spot accurately and immediately from the body itself. As a result, it is possible to navigate the body accurately to a spot where ground facilities for navigation control are not provided. Further, it is possible to reduce labor and time for measuring an absolute coordinate, and moreover, it is possible to simplify the system structure. Further, it is possible to reduce flying hours and save the fuel.

Preferably, in the apparatus of the first aspect, the navigation calculating section comprises: a position error calculating unit for calculating the position error; and an error estimating filter for estimating errors of the acceleration, the velocity and the body position based on the position error calculated by the position error calculating unit.

Preferably, in the method of the second aspect, the calculating the navigation information includes: calculating the position error; and estimating errors of the acceleration, the velocity and the body position based on the calculated position error.

Preferably, in the apparatus of the first aspect, the error estimating filter is one of a linear filter and a Kalman filter.

Preferably, in the method of the second aspect, the estimating the errors is performed by using one of a linear filter and a Kalman filter.

Preferably, in the apparatus of the first aspect and in the method of the second aspect, the navigation information includes at least one of the acceleration of the body with respect to the target spot, a velocity of the body with respect to the target spot, the relative position of the body with respect to the target spot, an acceleration error correction value of the body, a velocity error correction value of the body and a position error correction value of the body.

Preferably, the method of the second aspect further comprises automatically operating the body based on the navigation information.

Preferably, in the method of the second aspect, the automatically operating the body includes operating the body to land based on the navigation information.

Preferably, in the method of the second aspect, the automatically operating the body includes operating the body to take off based on the navigation information.

Preferably, in the method of the second aspect, the automatically operating the body includes operating the body to hover based on the navigation information.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 1 is a block diagram for describing a whole structure of a navigation apparatus according to an embodiment of the present invention.

PREFERRED EMBODIMENTS OF THE INVENTION

Hereinafter, an embodiment of the present invention will be described with reference to figures.

Figure 2A:
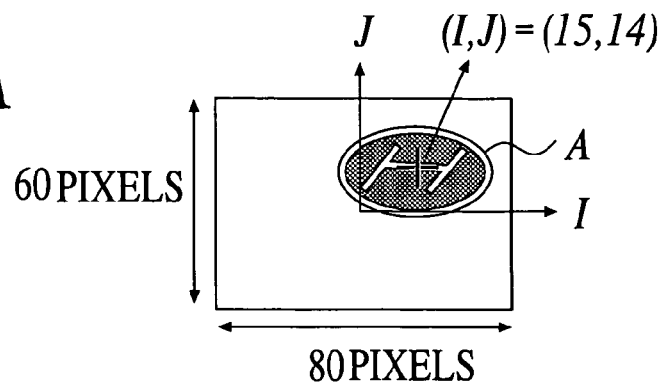
FIG. 2A is an explanatory view for describing an image process by an image processing unit of the navigation apparatus shown in FIG. 1, FIGS. 2B and 2C are explanatory views for describing a position coordinate calculating process by an image process calculating unit of the navigation apparatus shown in FIG. 1.
Figure 2B:
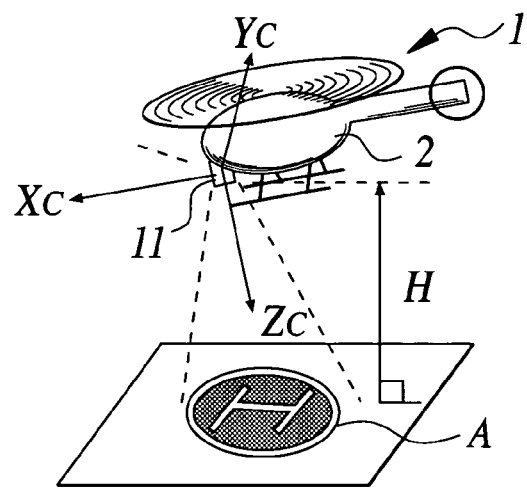
Figure 2C:
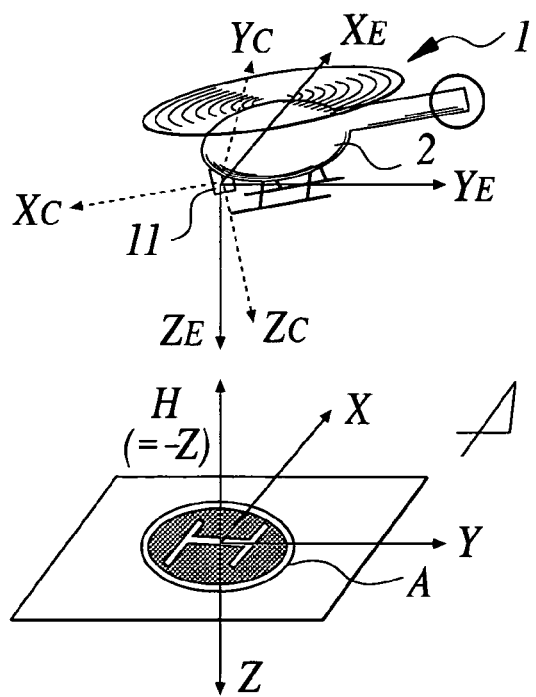

Here, it is assumed that a navigation apparatus 10 with image recognition according to the embodiment of the present invention is mounted on a manned helicopter 1 (see FIGS. 2B and 2C). On the helicopter 1, in addition to the navigation apparatus 10 according to the present embodiment, mounted are a GPS receiver for receiving positional information from a GPS satellite, an automatic operation apparatus which drives the helicopter on autopilot in response to the positional information or the like which is outputted from the navigation apparatus 10 (navigation output), and the like.

First, with reference to FIGS. 1 to 3, a structure of the navigation apparatus 10 according to the present embodiment will be described.

The navigation apparatus 10 comprises a stereo camera 11 which is fixed at the lower part of an aircraft body 2 of the helicopter 1 (see FIG. 2B), an inertial sensor 12 which measures an acceleration and an attitude angle of the aircraft body 2, an image processing unit 13 which performs a process on image information of a target spot obtained by the stereo camera 11, an image position calculating unit 14 which calculates relative positional information of the aircraft body 2 with respect to the target spot based on the positional information of the target spot calculated by the image processing unit 13, a navigation calculating unit 15 which calculates positional information of the aircraft body 2 based on the acceleration of the aircraft body 2 measured by the inertial sensor 12, and the like (see FIG. 1).

As shown in FIG. 1, the stereo camera 11 is used for obtaining image information of vicinity of the target spot (for example, a landing spot marker A) to have the helicopter land on. Further, the stereo camera 13 is the imaging section in the present invention. The inertial sensor 12 comprises a plurality of gyros and a plurality of accelerometers, and is used for measuring an attitude angle (roll angle $\Phi$, pitch angle $\theta$ and yaw angle $\psi$) and an acceleration of the aircraft 2. Further, the inertial sensor 12 is the inertial information detecting section in the present invention. Here, the acceleration measured by the inertial sensor 12 is an acceleration in a body-fixed coordinate system.

The image processing unit 13 calculates a center position coordinate of the target spot on the screen by processing the image information of the vicinity of the target spot obtained by the stereo camera 11. Concretely, as shown in FIG. 2A, the image processing unit 13 sets a coordinate system (I-J coordinate system) so as to define the center of a predetermined screen as the origin thereof, and calculates a coordinate (I,J) of the center position of the target spot. Further, the image processing unit 13 performs the stereo processing on the image information of the vicinity of the target spot obtained by the stereo camera 11 for calculating a distance from the stereo camera 11 to the target spot (see FIG. 2B).

The image position calculating unit 14 calculates a relative position of the aircraft body 2 with respect to the target spot, based on the attitude angle of the aircraft body 2 measured by the inertial sensor 12 and the distance to the target spot calculated by the image processing unit 13. Here, a method for calculating a relative position of the aircraft body 2 by the image position calculating unit 14 will be described concretely.

At first, with the use of the following equation (A), the image position calculating unit 14 converts parameters (I, J, H), which are a pixel position (I, J) in the screen of the target spot calculated by the image processing unit 13 (that is equal to the pixel number from the center of the screen) and a height H of the aircraft body 2, into a positional coordinate $(X_C, Y_C, Z_C)$ in a body-fixed coordinate system (that is a distance from the aircraft body). Here, the body-fixed coordinate system is a three-dimensional coordinate system structured from a camera visual axis direction of the stereo camera 11 (downward of the aircraft body 2) as the $Z_C$ axis, an upward direction of the screen by the stereo camera 11 (ahead of the aircraft body 2) as the $X_C$ axis, and a right direction of the screen by the stereo camera 11 (starboard direction of the aircraft body 2) as the $Y_C$ axis (see FIG. 2B).

$$\begin{pmatrix} X_C \\ Y_C \\ Z_C \end{pmatrix} = \frac{H\sqrt{1+\tan^2\phi+\tan^2\theta}}{1+K_2 \times \tan\phi + K_1 \times \tan\theta} \begin{pmatrix} K_1 \times J \\ K_2 \times I \\ 1 \end{pmatrix} \quad (A)$$

In the equation (A), $K_1$ and $K_2$ are coefficient determined by a field angle of the stereo camera 11, and calculated by the following equations (B) and (C)

$$K_1 = \tan(\alpha_J/2) \quad (B)$$

$$K_2 = \tan(\alpha_I/2) \quad (C).$$

In the equations (B) and (C), $\alpha_J$ and $\alpha_I$ are sizes of the field angle of the stereo camera 11 in J direction and I direction, respectively.

Then, with the use of the following equation (D), the image position calculating unit 14 converts the positional coordinate $(X_C, Y_C, Z_C)$ of the target spot in the body-fixed coordinate system calculated by the equation (A), into a positional coordinate $(X_E, Y_E, Z_E)$ in an inertial coordinate system. The inertial coordinate system is a three-dimensional coordinate system structured by a direction toward north as the $X_E$ axis, a direction toward east as the $Y_E$ axis, and a vertical direction as the $Z_E$ axis, with the center of the stereo camera 11 defined as the origin (see FIG. 2C). The origin of the inertial coordinate system is moved together with the aircraft body 2.

$$\begin{pmatrix} X_E \\ Y_E \\ Z_E \end{pmatrix} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi + \sin\phi\cos\psi \\ -\sin\theta & \sin\phi\cos\theta & \cos\phi\cos\theta \end{pmatrix} \begin{pmatrix} X_C \\ Y_C \\ Z_C \end{pmatrix} \quad (D)$$

Sequentially, the image position calculating unit 14 obtains a relative positional coordinate (X, Y, Z) of the aircraft body 2 in an earth-fixed coordinate system, by reversing the signs of the positional coordinate $(X_E, Y_E, Z_E)$ of the target spot in the inertial coordinate system calculated by the equation (D) (see equation (E)). Here, the earth-fixed coordinate system is a three-dimensional coordinate system structured by a direction toward north as the X axis, a direction toward east as the Y axis, and a vertical direction as the Z axis, with the center of the target spot defined as the origin (see FIG. 2C).

$$\begin{pmatrix} X \\ Y \\ Z \end{pmatrix} = \begin{pmatrix} -X_E \\ -Y_E \\ -Z_E \end{pmatrix} \quad (E)$$

Here, since a value of the Z axis increases in the vertical downward direction in the earth-fixed coordinate system, by reversing the sign of the Z axis coordinate, it is possible to obtain the height H of the aircraft body 2 (see FIG. 2C and equation (F)).

$$H = -Z \quad (F)$$

The coordinate (X, Y, H) calculated through the above-described steps is a relative position of the aircraft body 2 with respect to the target spot. Here, the combination of the image processing unit 13 and the image position calculating unit 14 realizes the image process calculating section of the present invention.

Figure 3:
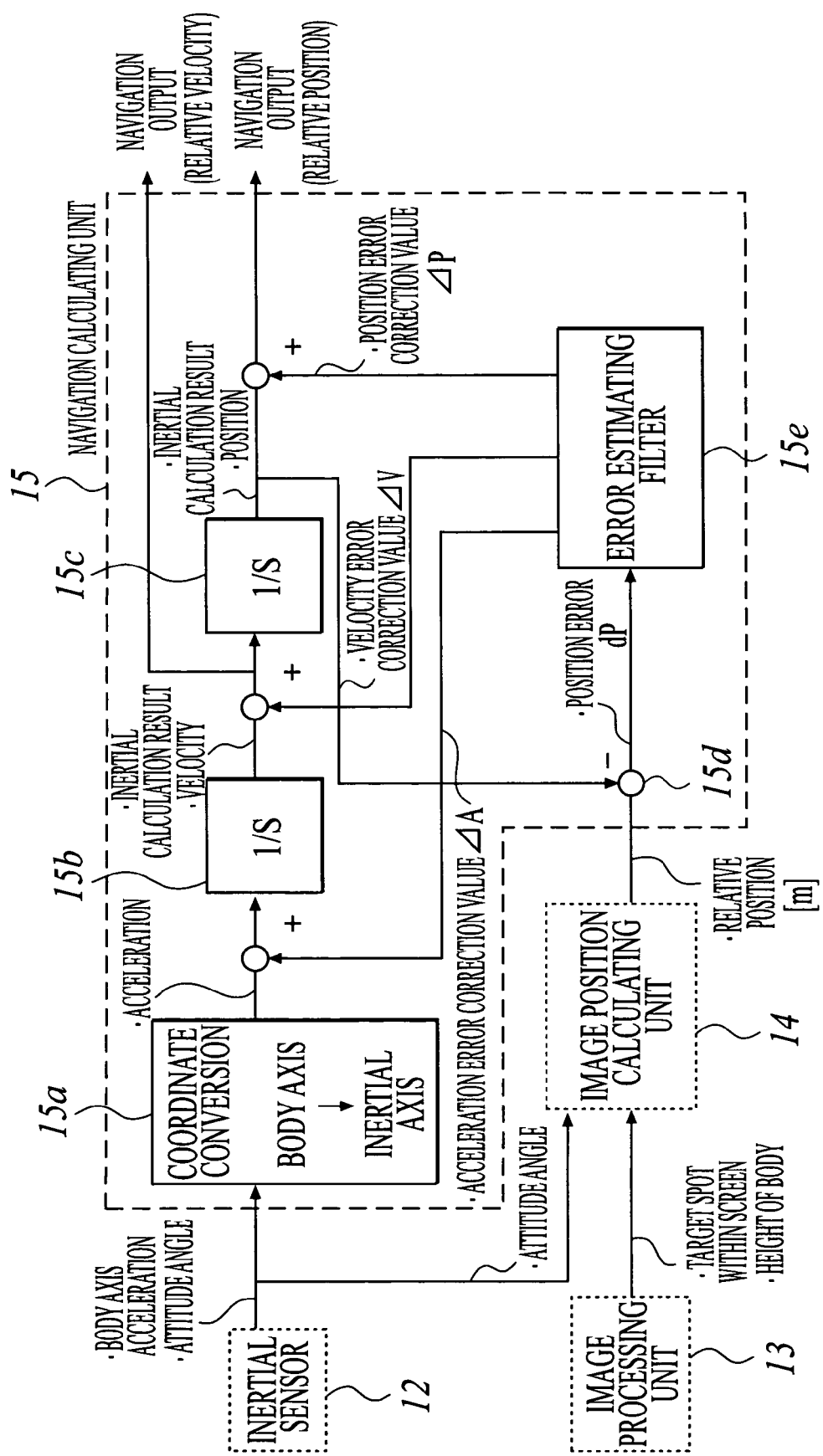
FIG. 3 is a block diagram for describing a structure of a navigation calculating unit of the navigation apparatus shown in FIG. 1.

The navigation calculating unit 15, as shown in FIG. 3, comprises a coordinate converting unit 15a, a first integrator 15b and a second integrator 15c. The coordinate converting unit 15a is used for converting an acceleration of the aircraft body 2 in the body-fixed coordinate system measured by the inertial sensor 12, into an acceleration in the inertial coordinate system. The first integrator 15b is used for calculating velocity of the aircraft body 2 by integrating the acceleration in the inertial coordinate system obtained by the coordinate converting unit 15a, and realizes the velocity calculating section of the present invention. The second integrator 15c is used for calculating a position of the aircraft body 2 by integrating the velocity calculated by the first integrator 15b, and realizes the position calculating section of the present invention. With the coordinate converting unit 15a, the first integrator 15b and the second integrator 15c, it is possible to calculate a velocity and a position of the aircraft body 2 with respect to the target spot based on the acceleration measured by the inertial sensor 12.

Further, as shown in FIG. 3, the navigation calculating unit 15 further comprises a position error calculating unit 15*d* and an error estimating filter 15*e*. The position error calculating unit 15*d* is used for calculating a differential (position error) between a relative position of the aircraft body 2 calculated by the image position calculating unit 14 and a position of the aircraft body 2 calculated by the second integrator 15*c*. The error estimating filter 15*e* is used for outputting a correction value for correcting the position of the aircraft body 2 calculated by the second integrator 15*c* or the like, based on the position error calculated by the position error calculating unit 15*d*. As the error estimating filter 15*e*, it is possible to adopt a linear filter, a Kalman filter and the like. With the position error calculating unit 15*d* and the error estimating filter 15*e*, the position of the aircraft body 2 calculated based on the acceleration measured by the inertial sensor 12 or the like is corrected with the use of the relative position of the aircraft body 2 calculated by the image position calculating unit 14.

Next, an automatic landing operation of the helicopter 1 using the navigation apparatus 10 according to the present invention will be described. In the present embodiment, the description will be made under the assumption that the helicopter 1 is automatically navigated to land on the landing spot sign A (target spot) of a heliport.

At first, an operator operates the aircraft body 2 to air space above the vicinity of the landing spot sign A by using the automatic operation apparatus mounted on the helicopter 1. At this time, the navigation calculating unit 15 of the helicopter 1 corrects the velocity and the position of the aircraft body 2 calculated based on the acceleration measured by the inertial sensor 12 according to information regarding a velocity and a position transmitted from a GPS satellite.

Next, when the helicopter 1 arrived at the air space above the vicinity of the landing spot sign A and an image of the landing spot sign A can be obtained, the stereo camera 11 automatically obtains image information of the landing spot sign A.

Then, the image processing unit 13 processes the image information for calculating parameters (I,J,H) which comprises the coordinate (I,J) of the center position of the landing spot sign A and the height H of the aircraft body 2 (see FIGS. 2A and 2B). Here, in the present embodiment, a screen of 60 pixels×80 pixels is used as an example, and it is assumed that the coordinate (I,J) of the center position of the landing spot sign A is calculated as (15 pixels, 14 pixels).

When the parameters (I,J,H) calculated by the image processing unit 13 are transmitted to the image position calculating unit 14, the image position calculating unit 14 calculates a relative position (X,Y,H) of the aircraft body 2 with respect to the landing spot sign A based on the parameters (I,J,H) (see FIG. 2C).

When the calculation result by the image position calculating unit 14 is transmitted to the navigation calculating unit 15, the position error calculating unit 15*d* of the navigation calculating unit 15 calculates a difference (position error dP) between the relative position (X,Y,H) of the aircraft body 2 calculated by the image position calculating unit 14 and the position of the aircraft body 2 calculated based on the acceleration measured by the inertial sensor 12 (see FIG. 3). Then, the error estimating filter 15*e* of the navigation calculating unit 15 outputs an acceleration error correction value ΔA, a velocity error correction value ΔV and a position error correction value ΔP, based on the position error correction value ΔP (see FIG. 3).

Based on the acceleration error correction value ΔA, the velocity error correction value ΔV and the position error correction value ΔP, an acceleration measured by the inertial sensor 12, a velocity and a position calculated according to the integral calculation are corrected. As a result, a highly accurate navigation output (information regarding a velocity and a position of the aircraft body 2 with respect to the landing spot sign A) is transmitted from the navigation calculating unit 15 to the automatic operation apparatus.

Thereafter, in response to the highly accurate navigation output from the navigation calculating unit 15, the automatic operation apparatus brings the aircraft body 2 down while controlling the position, the height, the descending rate and the like of the aircraft body 2, for having the helicopter 1 land on the landing spot sign A. Here, as a method for landing the helicopter in this case, it is possible to adopt a method according to which the inventor of the present invention has applied (for example, see JP-Tokugan-2002-295174).

In the navigation apparatus 10 of the embodiment as described above, the image position calculating unit 14 calculates a relative position (X,Y,H) of the aircraft body 2 with respect to the landing spot sign A, based on the attitude angle measured by the inertial sensor 12 and the image information of the landing spot sign A obtained by the stereo camera 11. Further, a position of the aircraft body 2 is calculated according to the integral calculation based on the acceleration of the aircraft body 2 measured by the inertial sensor 12. Then, with the use of the relative position (X,Y,H) of the aircraft body 2 calculated by the image position calculating unit 14, the position of the aircraft body calculated according to the integral calculation is corrected. In other words, it is possible to correct information regarding a position calculated according to the integral calculation, the position having a bias error, with the use of information regarding a comparatively accurate relative position calculated with image recognition.

Therefore, even if ground facilities for navigation control such as a microphone, millimeter-wave radar apparatus or the like are not provided in the vicinity of the landing spot sign A, it is possible to obtain navigation information (information regarding a position of the aircraft body 2) accurately. Thereby, it is possible to accurately navigate the aircraft body 2 to land. Further, since it is possible to obtain navigation information accurately without using DGPS, it is not necessary to measure an absolute coordinate of the landing spot sign A. Therefore, it is possible to reduce labor and time for measuring the absolute coordinate thereof. Further, since it is not necessary to wait for the convergence of the DGPS solution, it is possible to obtain the navigation information immediately, and thereby it is possible to reduce flying hours and to save fuel.

Here, in the embodiment as above, described is the example that the navigation apparatus 10 is used when the helicopter 1 is navigated to land on a predetermined target spot (the landing spot sign A of a heliport) automatically. However, with the use of the navigation apparatus 10 according to the present invention, it is possible to have the helicopter automatically take off from a predetermined target spot. Further, it is also possible to use the navigation apparatus according to the present invention in the case of having the helicopter 1 hover above a predetermined spot at a predetermined height.

Further, in the embodiment above, described is the example that the navigation apparatus according to the present invention is mounted on the helicopter 1. However, it is possible to obtain a similar effect when the navigation apparatus according to the present invention is mounted on other types of vertical-takeoff aircrafts.

The entire disclosure of a Japanese Patent Application No. Tokugan 2003-348452 filed on Oct. 7, 2003, including specifications, claims, drawings and summaries are incorporated herein by reference in their entirety.

What is claimed is:

1. A navigation apparatus with image recognition, comprising:
   an imaging section for obtaining a stereo image of a target spot;
   an inertial information detecting section for measuring an attitude angle of a body and an acceleration of the body;
   an image process calculating section for calculating a relative position of the body with respect to the target spot based on the stereo image and the attitude angle; and
   a navigation calculating section which comprises a position calculating section for calculating a body position based on the acceleration; and a position error calculating unit for calculating a position error by comparing between the relative position and the body position, and wherein said navigation calculating section for calculating navigation information calculates navigation information on the basis of attitude angle, the acceleration and the position error.

2. The apparatus according to claim 1, wherein the position calculating section comprises:
   a velocity calculating unit for calculating velocity by integrating the acceleration; and
   a position calculating unit for calculating the body position by integrating the velocity, and
   the apparatus corrects the acceleration, the velocity and the body position based on the position error and outputs the corrected velocity and the corrected body position as the navigation information.

3. The apparatus according to claim 2, wherein the navigation calculating section comprises:
   an error estimating filter for estimating errors of the acceleration, the velocity and the body position based on the position error calculated by the position error calculating unit.

4. The apparatus according to claim 3, wherein the error estimating filter is one of a linear filter and a Kalman filter.

5. The apparatus according to claim 1, wherein the navigation information includes at least one of the acceleration of the body with respect to the target spot, a velocity of the body with respect to the target spot, the relative position of the body with respect to the target spot, an acceleration error correction value of the body, a velocity error correction value of the body and a position error correction value of the body.

6. A navigation method with image recognition comprising:
   obtaining a stereo image of a target spot;
   measuring an attitude angle of a body and an acceleration of the body;
   calculating a relative position of the body with respect to the target spot based on the stereo image and the attitude angle;
   calculating a body position based on the acceleration;
   calculating a position error by comparing between the relative position and the body position; and
   calculating navigation information based on the attitude angle, the acceleration and the position error.

7. The method according to claim 6, wherein calculating the navigation information comprises:
   calculating a velocity by integrating the acceleration;
   calculating the body position by integrating the velocity;
   correcting the acceleration, the velocity and the body position based on the position error; and
   outputting the corrected velocity and the corrected body position as the navigation information.

8. The method according to claim 7, further comprising:
   estimating errors of the acceleration, the velocity and the body position based on the calculated position error.

9. The method according to claim 8, wherein the estimating the errors is performed by using one of a linear filter and a Kalman filter.

10. The method according to claim 6, wherein the navigation information includes at least one of the acceleration of the body with respect to the target spot, a velocity of the body with respect to the target spot, the relative position of the body with respect to the target spot, an acceleration error correction value of the body, a velocity error correction value of the body and a position error correction value of the body.

11. The method according to claim 6, further comprises automatically operating the body based on the navigation information.

12. The method according to claim 11, wherein the automatically operating the body includes operating the body to land based on the navigation information.

13. The method according to claim 11, wherein the automatically operating the body includes operating the body to take off based on the navigation information.

14. The method according to claim 11, wherein the automatically operating the body includes operating the body to hover based on the navigation information.

* * * * *